United States Patent
Hunsinger et al.

(10) Patent No.: US 7,992,155 B2
(45) Date of Patent: *Aug. 2, 2011

(54) METHOD AND SYSTEM TO CORRELATE AND CONSOLIDATE A PLURALITY OF EVENTS

(75) Inventors: Kenneth M. Hunsinger, Raleigh, NC (US); Abdolreza Salahshour, Raleigh, NC (US); Michael L. Wamboldt, Garner, NC (US)

(73) Assignee: International Business Machines Corporation, Armonk, NY (US)

( * ) Notice: Subject to any disclaimer, the term of this patent is extended or adjusted under 35 U.S.C. 154(b) by 247 days.

This patent is subject to a terminal disclaimer.

(21) Appl. No.: 12/233,263

(22) Filed: Sep. 18, 2008

(65) Prior Publication Data

US 2009/0007146 A1 Jan. 1, 2009

Related U.S. Application Data

(63) Continuation of application No. 10/905,562, filed on Jan. 11, 2005, now Pat. No. 7,472,397.

(51) Int. Cl.
*G06F 3/00* (2006.01)
*G06F 9/44* (2006.01)
*G06F 9/46* (2006.01)

(52) U.S. Cl. ............ 719/318
(58) Field of Classification Search ............ 719/318
See application file for complete search history.

(56) References Cited

U.S. PATENT DOCUMENTS

| | | | |
|---|---|---|---|
| 6,185,613 B1 | 2/2001 | Lawson et al. | |
| 6,233,587 B1 | 5/2001 | Tandon | |
| 6,766,368 B1 | 7/2004 | Jakobson et al. | |
| 7,275,250 B1 | 9/2007 | Novik et al. | |
| 7,647,595 B2 * | 1/2010 | Chandrasekaran | 719/318 |
| 7,681,203 B2 * | 3/2010 | Mandato et al. | 719/316 |
| 2003/0093403 A1 | 5/2003 | Upton | |
| 2003/0093575 A1 | 5/2003 | Upton | |
| 2004/0230874 A1 | 11/2004 | Prang et al. | |
| 2006/0130070 A1 | 6/2006 | Graf | |

* cited by examiner

*Primary Examiner* — H. S. Sough
*Assistant Examiner* — KimbleAnn Verdi
(74) *Attorney, Agent, or Firm* — Charles L. Moore; Moore & Van Allen PLLC

(57) ABSTRACT

A system to correlate and consolidate a plurality of events includes at least one adapter to correlate and consolidate every one of the plurality of events to form a multi-personality event. Each one of the plurality of events is emitted in response to an incident affecting an event producer. The system also includes a plurality of smart event adapters to correlate and consolidate each of the plurality of events to form the multi-personality event. The multi-personality event includes complete details contained in each event of the plurality of events serially appended to an initial multi-personality event formed by two of the plurality of events. Each remaining event is serially appended the initial multi-personality event.

16 Claims, 8 Drawing Sheets

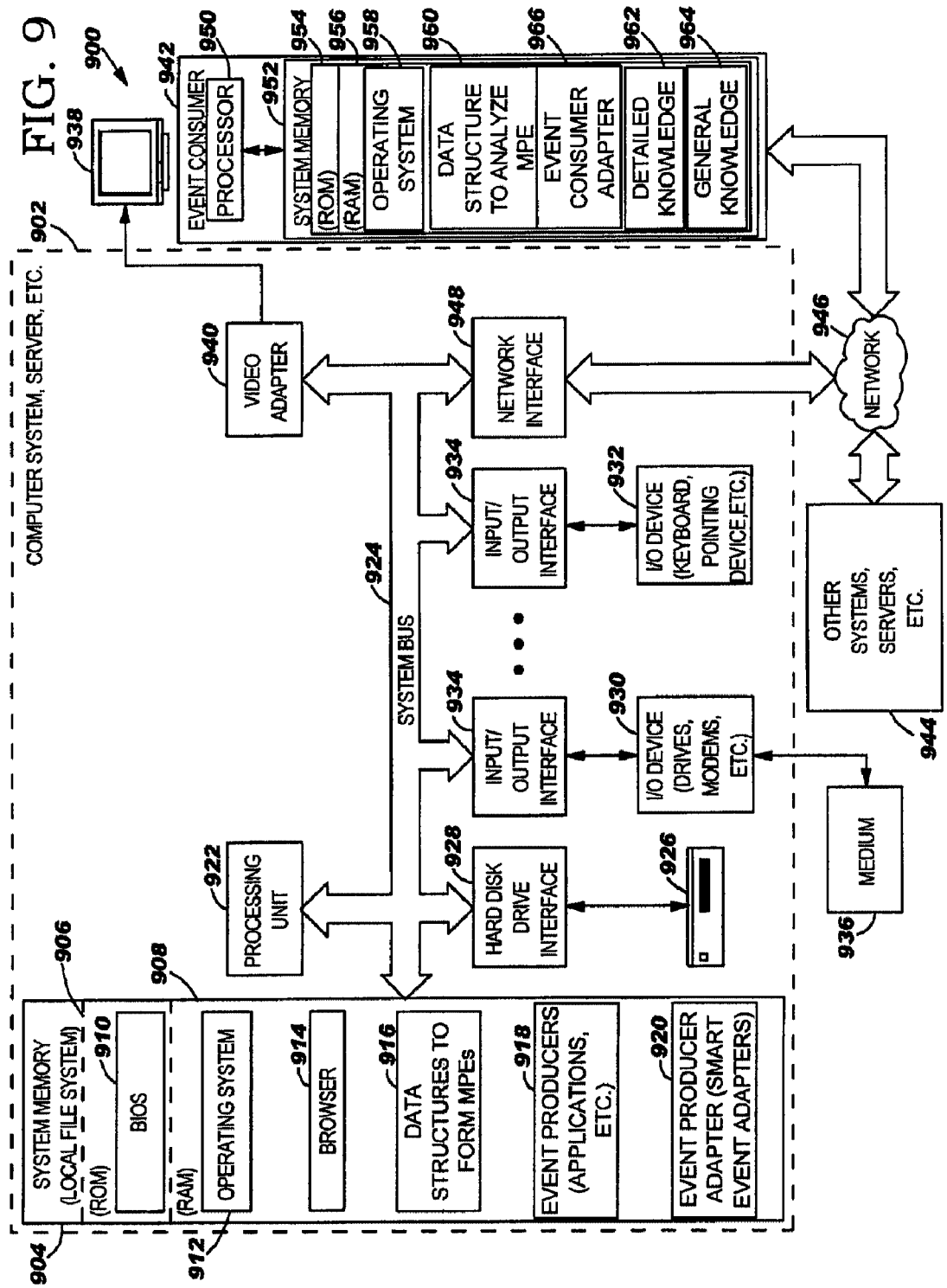

US 7,992,155 B2

METHOD AND SYSTEM TO CORRELATE AND CONSOLIDATE A PLURALITY OF EVENTS

CROSS-REFERENCES

This application is a continuation application of U.S. patent application Ser. No. 10/905,562, filed Jan. 11, 2005, now U.S. Pat. No. 7,472,397, the contents of which are incorporated herein by reference.

BACKGROUND OF INVENTION

The present invention relates to computer systems and software and more particularly to a method and system to correlate and consolidate a plurality of events that may each be emitted by one of a plurality of components of an event producer in response to an incident that affects the event producer.

Software applications or event producers are typically complex combinations of multiple software components. An application may be a "vertical application," a "horizontal application" or a combination of both. A vertical application may be formed by a software stack consisting of multiple components and subcomponents that are tightly coupled to provide a unique and coordinated set of services. A horizontal application may be a business application or software solution consisting of multiple distributed components that are loosely coupled to provide a set of coordinated services.

The reporting of a detected incident, which may be a situation or condition, in an application typically does not result in the generation or emission of a single event, but rather the emission of multiple events, one from each component of the application to an event consumer. Each of these events attempts to describe the detected incident but from the perspective of the component emitting the event. The events emitted provide information only within the scope of the emitting software component with little or no knowledge of how that event and the services provided by the component integrate into the overall software application offerings and solutions. The events emitted by the software component need to be integrated and correlated with the events emitted by other software components in the application or solution in order for an event consumer or the like to effectively resolve or remedy the incident.

In current systems, event consumers need to be able to consume or integrate and analyze all of the events emitted by each of the components of an application or event producer to fully understand the underlying incident that triggered the event. In order to do this, event consumers need to have the data or knowledge to correlate all the events related to a situation and to determine the underlying situation or cause of the events by analyzing the detailed contents of each event from the perspective of the emitting component. Equipping or designing event consumers that can correlate and analyze multiple events from different application components are becoming increasingly difficult, if not impossible. Deployed systems are becoming increasingly complex and heterogeneous. Additionally, these systems need to be able to quickly and efficiently add new applications and application components. The increasing amount of deployed software and the volume of events that may be emitted can over stress the ability of event consumers to interpret and analyze the data contained in the events being received, and more importantly, to identify which events may be meaningful and require action.

The knowledge or data needed to interpret these events needs to be distributed with the event consumers so that each event consumer can understand the construction of the application including the application components and the perspective of these components in reporting an incident. The volume of knowledge or data that needs to be distributed and maintained further increases the complexity and cost of such systems.

FIG. 1 illustrates an example of a current system 100 to evaluate and analyze events 102-106. Each event 102-106 may be emitted or generated by a respective component 108-112 of an application 114 in response to an incident 116 affecting the application 114. The incident 116 may be any action or occurrence detected by the application 114 or program. Examples of an incident may be a user action, such as clicking a mouse button or pressing a key, a system occurrence, such as a fault, an interrupt, running out of memory, timeout of an operation or similar system related occurrence, or a business event, such as a transaction checkpoint or auditable condition. Each component 108-112 emits the associated event 102-106 reporting the incident 116 based on the component's particular perspective.

Each event 102-106 may be applied to an adapter 118 to adapt or transform each event 102-106 into a format, illustrated by adapted events 120-124 that can be understood by an event consumer 126. The event consumer 126 may be an event management system, such as IBM® Tivoli® Event Console, Hewlett Packard® OpenView®, or a Common Information Model (CIM) Manager, computer operating system, consuming application or the like. IBM and Tivoli are trademarks of International Business Machines Corporation in the United States, other countries, or both. Hewlett Packard and OpenView are trademarks of Hewlett Packard Company in the United States, other countries, or both. As previously discussed, special knowledge 128 or data needs to be distributed with the event consumer 126 so that the event consumer 126 can understand and interpret the transformed events 120-124 to provide an analysis or solution 130 for the incident 116.

FIG. 2 illustrates another example of a current system 200 to evaluate and analyze events 202-206 emitted by each component 208-212 of an application 214 in response to an incident 216. Each component 208-212 emits the associated event 202-206 reporting the incident 216 based on the component's own perspective. Similar to system 100, each event 202-206 is applied to an adapter 218 to adapt or transform each event 202-206 into a format (adapted events 220-224) that can be understood by an analysis engine 226.

Special detailed knowledge 228 needs to be distributed with the analysis engine 226 so that the analysis engine 226 can understand and interpret the transformed or adapted events 220-224. The analysis engine 226 emits a summary event 230 that is received by the event consumer 232. General knowledge 234 is distributed with the event consumer 232 to understand and interpret the summary event to provide an analysis 236, solution or the like.

BRIEF SUMMARY OF INVENTION

In accordance with an embodiment of the present invention, a method to correlate and consolidate a plurality of events may include consolidating each of the plurality of events to form a multi-personality event. Each event may be emitted or generated from a respective one of a plurality of components forming an event producer in response to an incident affecting the event producer. The method may also include providing the multi-personality event to an event consumer.

In accordance with another embodiment of the present invention, a system to correlate and consolidate a plurality of events may include at least one adapter to correlate and consolidate each of the plurality of events to form a multi-personality event. Each of the plurality of events may be emitted from a respective one of a plurality of components forming an event producer in response to an incident affecting the event producer.

In accordance with another embodiment of the present invention, a computer program product to correlate and consolidate a plurality of events may include a computer readable medium having computer readable program code embodied therein. The computer readable medium may include computer readable program code configured to consolidate each of the plurality of events to form a multi-personality event. Each event may be emitted or generated from a respective one of the plurality of components forming an event producer in response to an incident affecting the event producer. The computer readable medium may also include computer readable program code configured to provide the multi-personality event to an event consumer.

BRIEF DESCRIPTION OF THE SEVERAL VIEWS OF THE DRAWINGS

FIG. 9 is an exemplary system incorporating a method and system to form and analyze multi-personality events in accordance with an embodiment of the present invention.

DETAILED DESCRIPTION OF THE INVENTION

Figure 1:
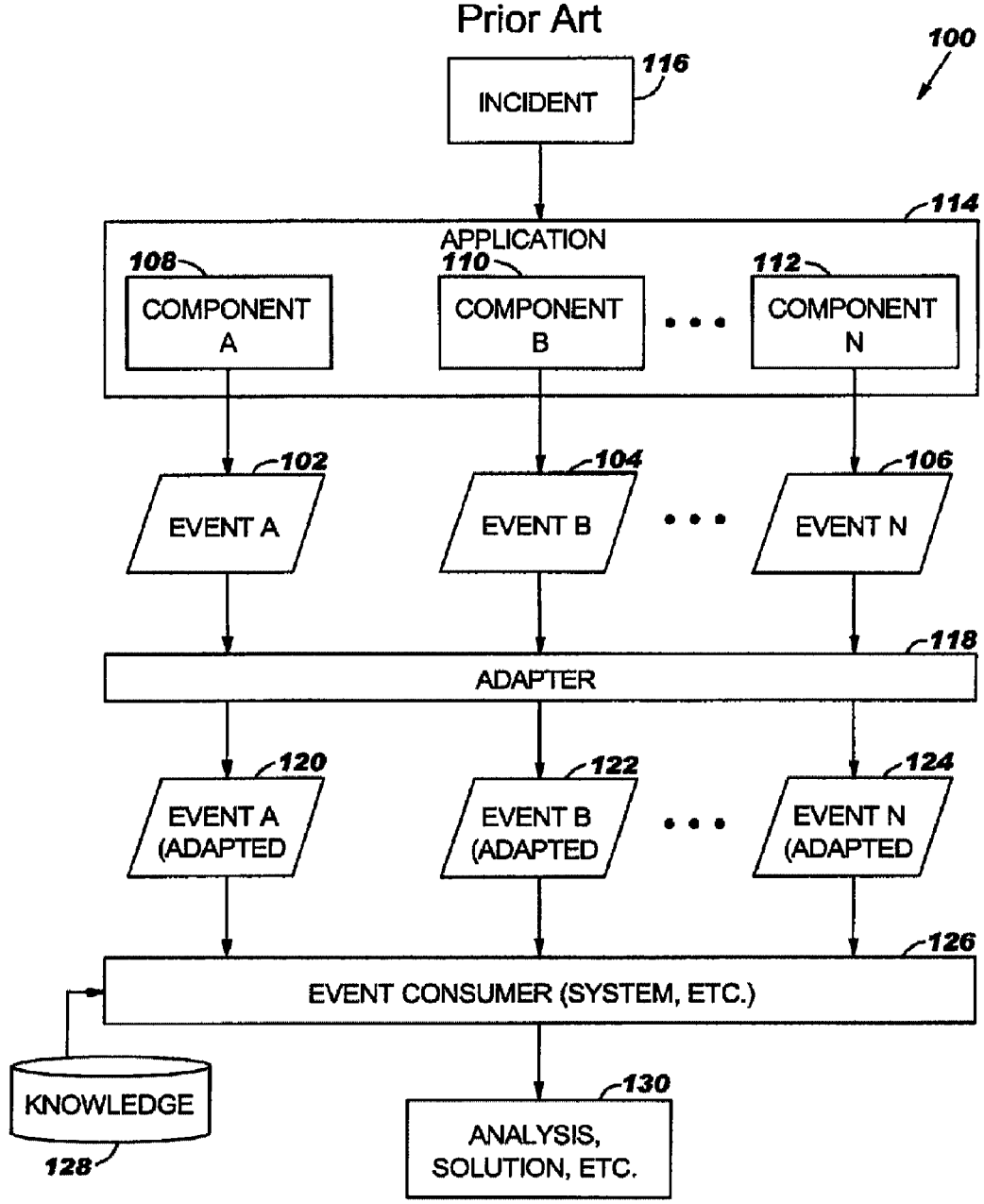
FIG. 1 is a block diagram of a prior art system to analyze events emitted by components of an application.
Figure 2:
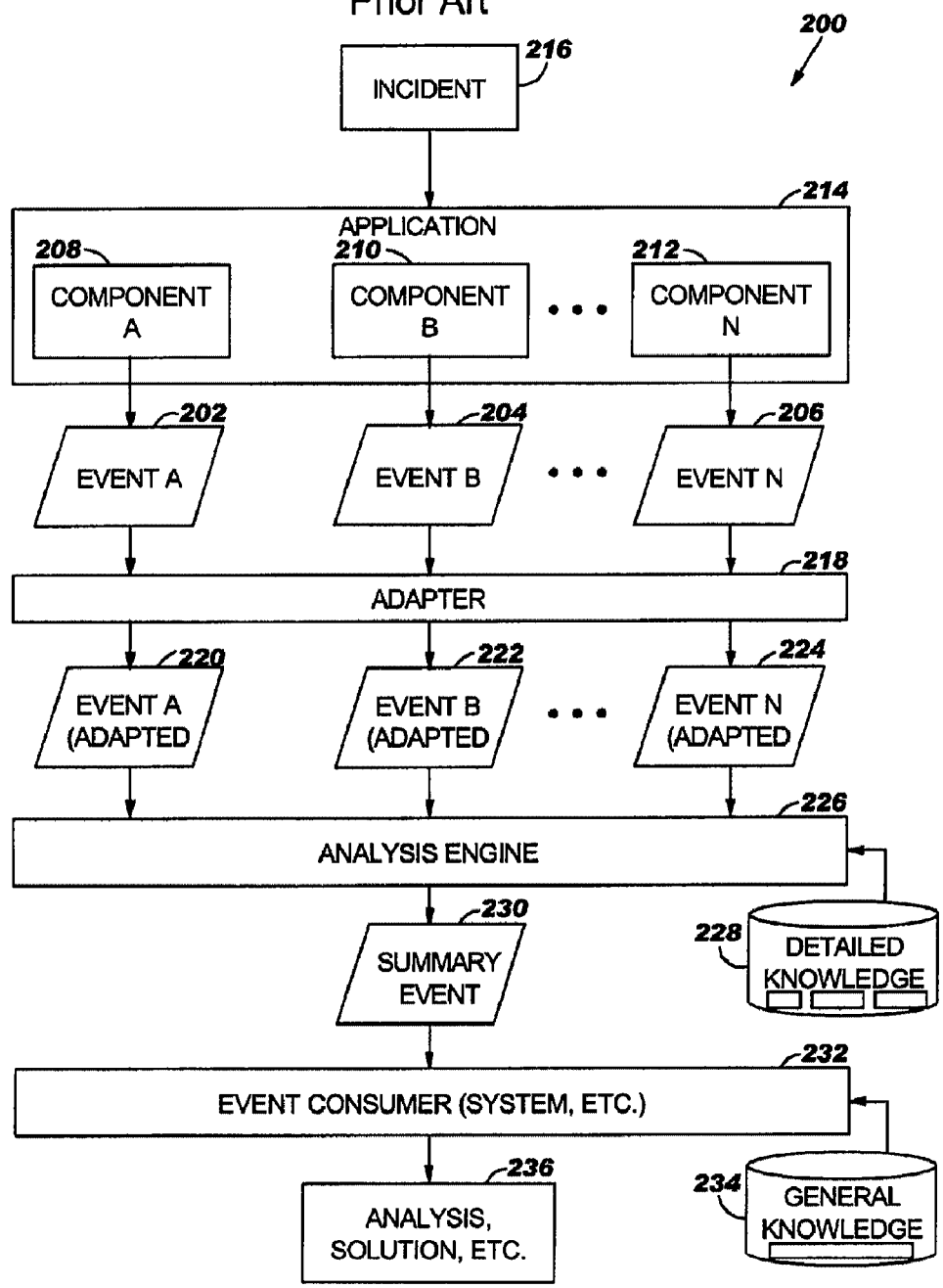
FIG. 2 is a block diagram of another prior art system to analyze events emitted by components of an application.

The following detailed description of embodiments refers to the accompanying drawings, which illustrate specific embodiments of the invention. Other embodiments having different structures and operations do not depart from the scope of the present invention.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit" or "module." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device or propagation medium. More specific examples (a nonexhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java7, Smalltalk or C++.

However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 3:
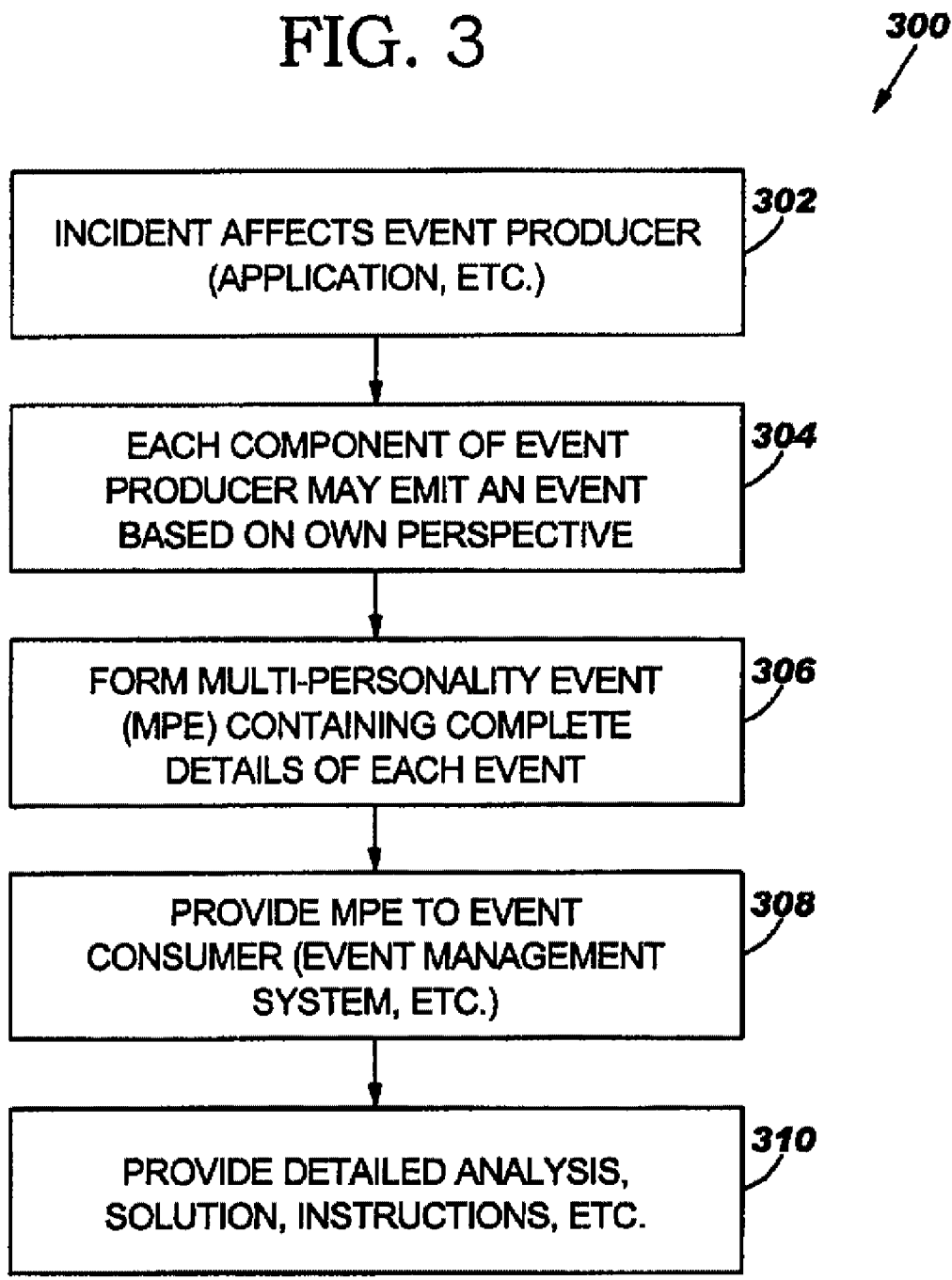
FIG. 3 is a flow chart of an example of a method to correlate and consolidate a plurality of events in accordance with an embodiment of the present invention.

FIG. 3 is a flow chart of an example of a method 300 to correlate and consolidate a plurality of events in accordance with an embodiment of the present invention. In block 302, an incident may affect an event producer. It will be appreciated by those skilled in the art that the incident may be a situation of condition. As used herein, an event producer may be a software application formed by a plurality of components or anything formed by a collection of components operating in conjunction with one another to provide a service or function, and wherein each of the components may emit or generate an event in response to an incident affecting the event producer. As previously discussed, examples of an incident may be a user action, such as clicking a mouse button or pressing a key, or a system occurrence, such as an interrupt, a fault, running out of memory, timeout of an operation or similar system or user related occurrence.

In block 304, each component of the event producer may emit or generate an event based on the detected incident based on the emitting component's own perspective of the incident. In block 306, a multi-personality event is formed. The multi-personality event (MPE) may contain substantially complete details of each event. In block 308, the MPE may be provided to an event consumer. The event consumer may include an event management system, consuming application or other system to analyze and evaluate the MPE and provide a detailed analysis, solution, instructions or the like to remedy or deal with the incident. The event consumer may be similar to current event consumers or event management systems that analyze individual events from respective components. In block 310, the detailed analysis, solution, instructions or the like may be provided to a user or other system to resolve or remedy the incident. Under some circumstances, the event consumer may be able to resolve the incident or determine the incident does not require resolution.

Figure 4:
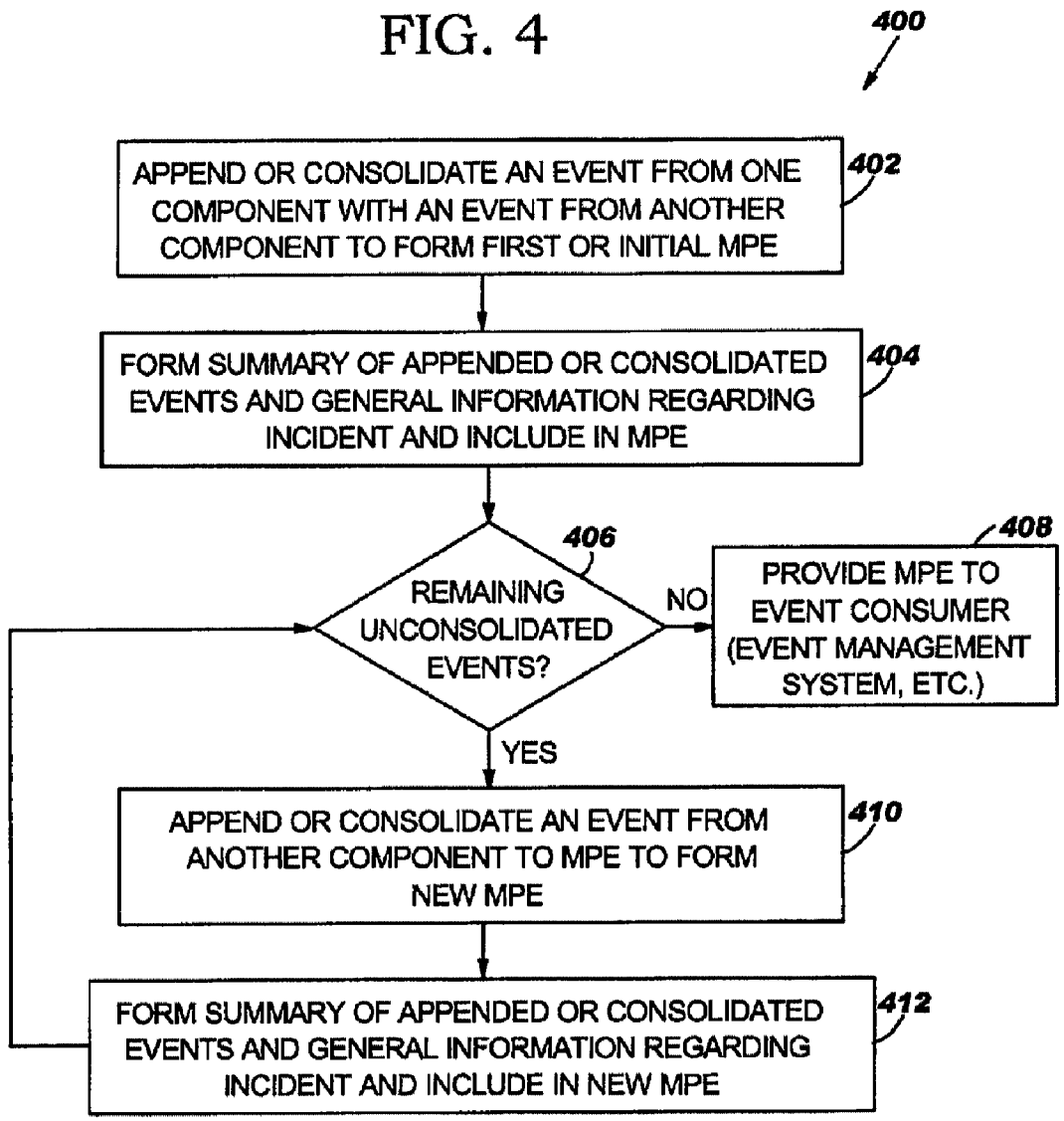
FIG. 4 is a flow chart of an example of a method to form a multi-personality event from a plurality of events in accordance with another embodiment of the present invention.

FIG. 4 is a flow chart of an example of a method 400 to form a multi-personality event from a plurality of events in accordance with an embodiment of the present invention. The method 400 may be used to form the multi-personality event in block 306 of FIG. 3. In block 402, an event from one component of an event producer may be appended or consolidated with an event from another component to form an initial or first multi-personality event.

In block 404, a summary of the consolidated or appended events may also be formed and included in the multi-personality event in accordance with one embodiment of the present invention. General information regarding the incident that may aid in interpreting and analyzing the multi-personality event and the events contained therein may also be included in the multi-personality event.

In block 406, a determination may be made whether there are any remaining events which have not been consolidated or appended to the multi-personality event. If there are no remaining unconsolidated events, the method 400 may advance to block 408. In block 408, the multi-personality event may be provided to an event consumer to provide a detailed analysis, solution, instructions or the like to remedy or resolve the incident.

If a determination is made in block 406 that there are remaining, unconsolidated events, the method 400 may advance to block 410. In block 410, an event from another component of the event producer may be appended or consolidated with the multi-personality event formed in block 404 or previously formed in block 410 to form a new multi-personality event. In block 412, a summary of the consolidated events may be formed or updated with the additional event and included to the multi-personality event formed in block 410. General information regarding the incident may also be updated and included in the new multi-personality personality event in block 412 based on the newly added event. The method 400 may then return to block 406 where a determination may be made whether there are any remaining, unconsolidated events. The method 400 may then continue as described above with respect to blocks 406-412.

In accordance with at least one embodiment of the present invention, substantially complete details contained in each event may be appended or consolidated to form the multi-personality event in method 400. The event details of each event may be kept separate from the event details of other events. The event details may be appended or consolidated serially to form the multi-personality event to provide an end-to-end scenario or flow of data, request or response related to the incident.

Figure 5:
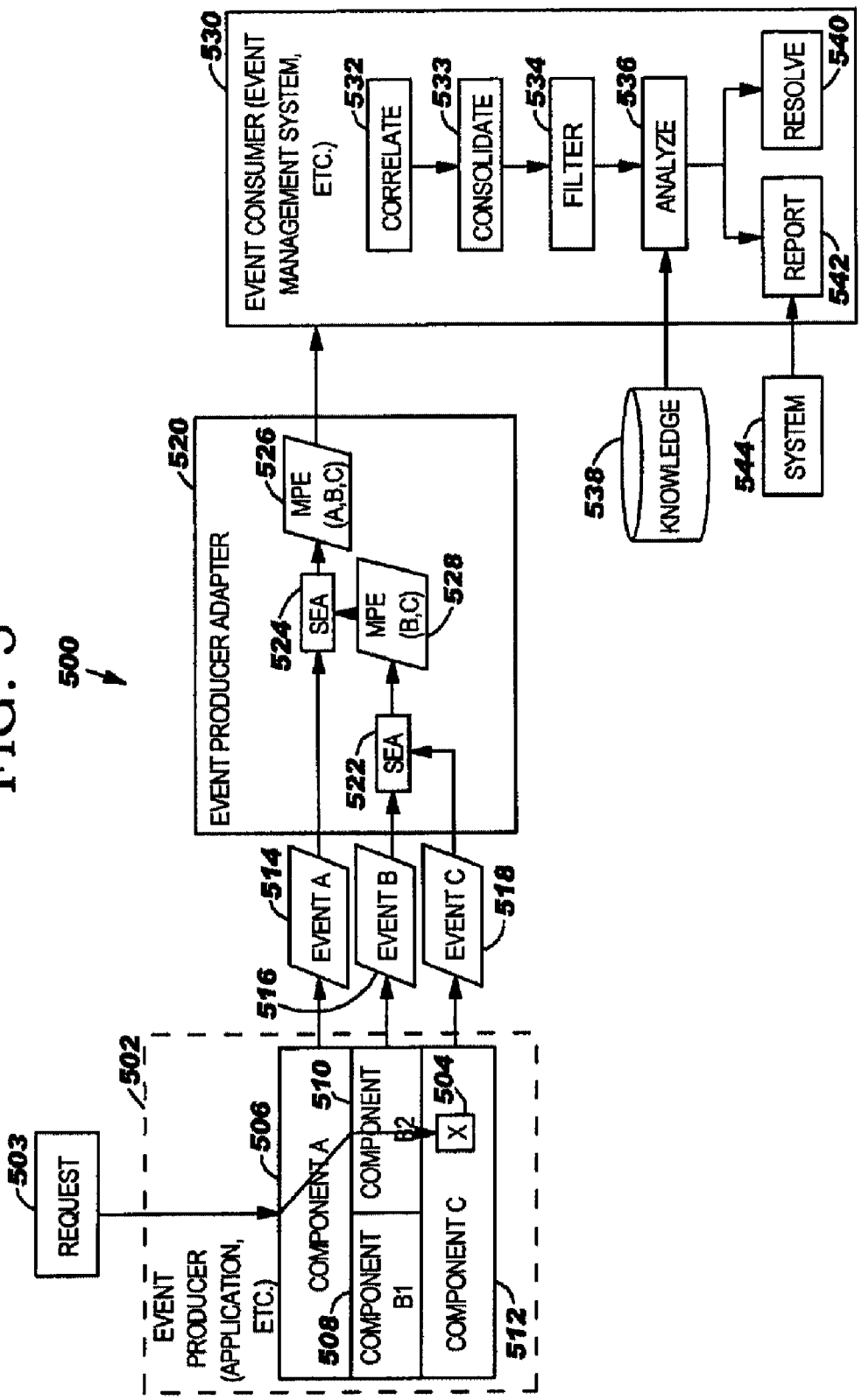
FIG. 5 is a block diagram of an exemplary system to correlate and consolidate a plurality of events in accordance with an embodiment of the present invention.

FIG. 5 is a block diagram of an exemplary system 500 to correlate and consolidate a plurality of events in accordance with an embodiment of the present invention. The methods 300 and 400 may be embodied in the system 500. An event producer 502 may receive a request 503 which may be processed by a plurality of components 506-512 that form the event producer 502 or application. The components 506-512 may be formed in a software stack as illustrated in FIG. 5 (vertical application as previously described), distributed in a system or network (horizontal application) or a combination of both. During the processing of the request 503, one of the components 506-512 may experience an incident 504, such as a failure in component C 512. Each component 506-512 may emit or generate an event 514-518 in response to the incident 504. Each event 514-518 may be generated from the perspective of the component generating the associated event which may be substantially different from the perspective of other components 506-512.

The system 500 may include at least one event producer adapter 520 that receives each of the events 514-518 to correlate and consolidate or append the events to form a multi-personality event. In the exemplary system 500 illustrated in FIG. 5, a plurality of smart event adapters (SEA) 522 and 524 may be deployed at or near the source of the events or the event producer 502. The smart event adapters 522 and 524 may serially append substantially the complete original details contained in each event 514-518 to form a final multi-personality event 526. Alternatively, the smart event adapters 522 and 524 may include or append references to the original events which may be accessed later when doing a detailed diagnosis of the incident 504. The event producer adapter 520 and smart event adapters 522 and 524 may be embodied in hardware and/or software.

In the example of FIG. 5, event B 516 and event C 518 may be intercepted by a first smart event adapter 522. The first smart event adapter 522 may form an initial or first multi-personality event 528 from event B 516 and event C 518. The first multi-personality event 528 may report the incident 504 from the perspective of component B2 510. The initial or first multi-personality event 528 may include substantially complete details of each of the event B 516 and C 518.

The multi-personality event 528 may be intercepted by another higher-level smart event adapter 524 that is associated with the remaining, unconsolidated event A 514. The higher-level smart event adapter 524 may append or consolidate event A 514 with the multi-personality event 528 containing previously appended or consolidated events B and C 516 and 518 to form the final multi-personality event 526. The final multi-personality event 526 may report the situation from the perspective of event A 514 while including the detailed event information from all consolidated events, i.e., event A 514, event B 516 and event C 518. If the event producer 502 included additional components that emit additional events, the system 500 may include or form additional smart event adapters to intercept and consolidate the events. One smart event adapter may be associated with each remaining, unconsolidated event to append or consolidate the associated event with a previously formed multi-personality event containing previously appended or consolidated events.

Accordingly, each event may be consolidated with other events by chaining together in a step fashion or sequence continuing up the stack of components 506-512 until a final multi-personality event is formed incorporating the event from the highest level component as illustrated in FIG. 5. The final multi-personality event may report the incident from the perspective of the highest level component but contains detailed information from all other related events.

The final multi-personality event 526 containing all of the events 514-518 may be provided to an event consumer 530. The event consumer 530 may include functions or units to correlate 532, consolidate 533, filter 534 and analyze 536 the multi-personality event 526. The event consumer 530 or event management system may use the information in the multi-personality event 526 to provide a consolidated view of the incident. The event consumer 530 may use the information included in the events encapsulated by the multi-personality event to analyze and determine the root cause of the incident 504. The correlation 532, consolidation 533 and filtering 534 functions are significantly simplified because of the work previously performed by the smart event adapters 522-524. The event consumer 530 may apply a set 538 of knowledge or data to determine if the incident identified by the multi-personality event 526 warrants attention. If so, the incident may be further analyzed and recovery actions proposed to resolve 540 the incident. Alternatively, the multi-personality event 526 may be reported 542 to another system 544, which may be a human operator, for further analysis and action. Further analysis of the multi-personality event 526 may result in the need for detailed failure information from one or more of the components 506-512 that originally reported the situation, which will be available in the events 514-518 encapsulated by the multi-personality event 526.

Figure 6:
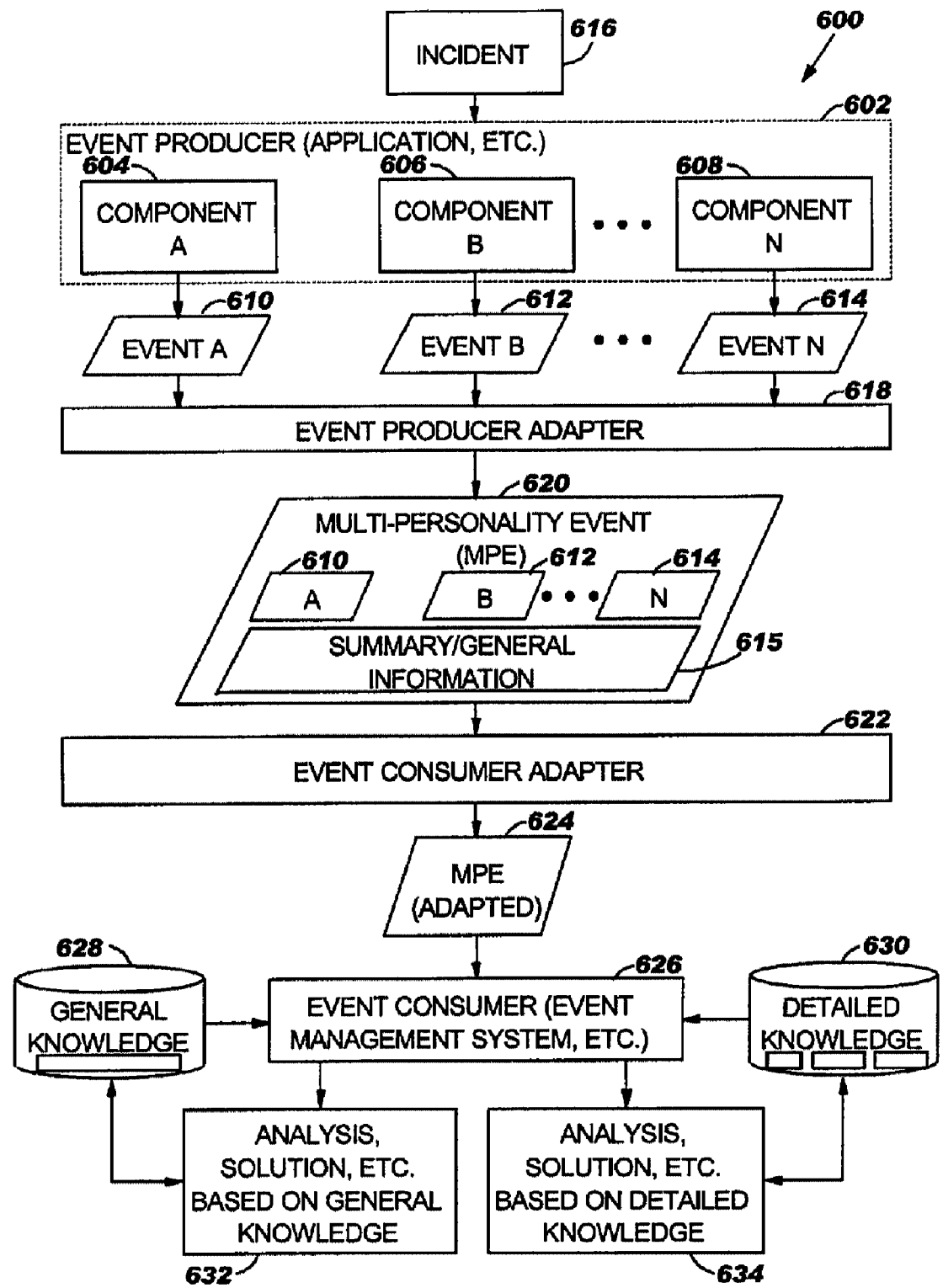
FIG. 6 is a block diagram of another exemplary system to correlate and consolidate a plurality of events in accordance with another embodiment of the present invention.

FIG. 6 is a block diagram of another exemplary system 600 to correlate and consolidate a plurality of events in accordance with another embodiment of the present invention. The methods 300 and 400 may be embodied in the system 600. An event producer 602 may be formed by a plurality of components 604, 606 and 608. The components 604-608 may be distributed as illustrated in FIG. 6 (horizontal application), formed in a stack similar to that illustrated in FIG. 5 (vertical application) or a combination thereof. Each of the components 604-608 may emit or generate an event 610-614 in response to an incident 616. Each event 610-614 may contain details about the incident 616 based on the perspective of the component 604-608 which may be different from each of the other components 604-608.

The system 600 may include an event producer adapter 618 to form a multi-personality event 620. The event producer adapter may be deployed at or near the source of the events or event producer 602. The event producer adapter 618 may be similar to the event producer adapter 520 in FIG. 5. The multi-personality event 620 may include substantially complete details of each event 610-614, as well as, summary information 615 from all events 610-614 and general information related to the incident 616.

Accordingly, the multi-personality event of the present invention provides the ability to correlate events by providing event consolidation of related events at the source of the event, either by chaining related events together as illustrated by the embodiment of FIG. 5 or using data encapsulation and augmentation as illustrated by multi-personality event 620 in FIG. 6.

In at least one embodiment of the present invention illustrated in FIG. 6, the system 600 may include an event consumer adapter 622 to form an adapted multi-personality event 624 or transform the multi-personality event 620 into a format that may be more understandable to an event consumer 626 but still contains the details associated with each event 610-614.

In another embodiment of the present invention, multi-personality event 620 may be provided directly to the event consumer 626. The adapters 618 and 622 may be embodied in hardware and/or software.

The event consumer 626 may access a database or database system 628 containing general knowledge or data and another database or database system 630 containing detailed knowledge or data to assist with interpreting, analyzing and evaluating the adapted multi-personality event 624 or multi-personality event 620, if adapter 622 is not present. The general knowledge may assist with interpreting the general information or summary information in the multi-personality event 620 or 624 and the detailed knowledge may assist with interpreting the detailed information in each event 610-614 contained in the multi-personality event 620 or 624. The event consumer may then provide analysis or solutions 632 based on the general situation and analysis or solutions 634 based on the detailed situation.

Figure 7:
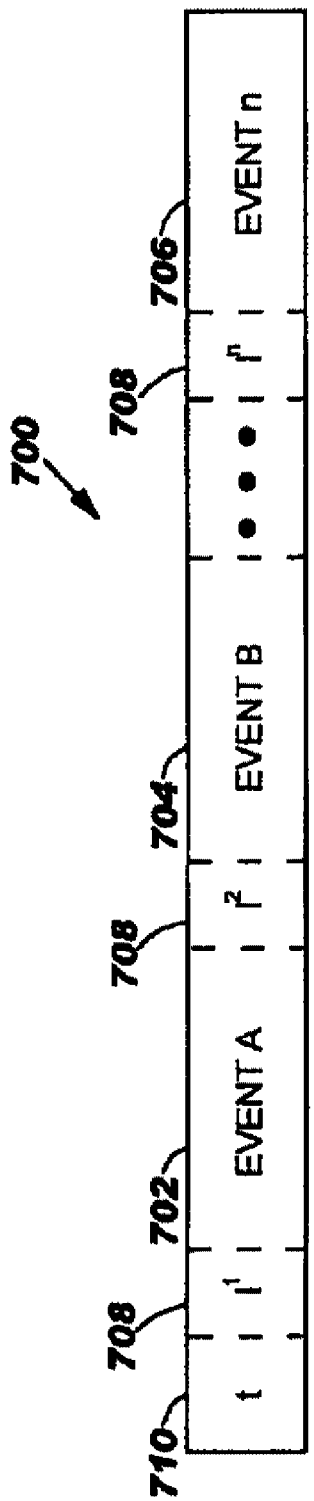
FIG. 7 is an example of a multi-personality event in accordance with an embodiment of the present invention.

FIG. 7 is an example of a multi-personality event 700 in accordance with an embodiment of the present invention. The multi-personality event 700 may be the same as the multi-personality event 526 formed by the system 500 of FIG. 5 and the multi-personality event 620 or 624 formed by the system 600 of FIG. 6. The multi-personality event 700 may also be formed by the method 300 or 400 of FIGS. 3 and 4, respectively. The multi-personality event 700 may include substantially complete details of each event 702-706. An individual event length field 708 may be associated with each event 702-706. The event consumer may then know where each event 702-706 begins and the amount of data contained in the corresponding event. The multi-personality event 700 may also include an overall event length field 710 for the multi-personality event 700. The overall event length may be the sum of the individual event lengths ($t=l^1+\ldots l^N$). Alternatively, the events 702-706 could be fixed lengths. In which case the overall event length could be expresses as $t=l\times N$ and there would be no need for individual event length fields 708. In either embodiment, the event consumer would know the entire amount of data contained in the multi-personality event 700 to facilitate analysis and the end-to-end flow of the transaction that resulted in the incident can be assessed with accurate consideration of the sequencing of the individual tasks of each component.

Figure 8:
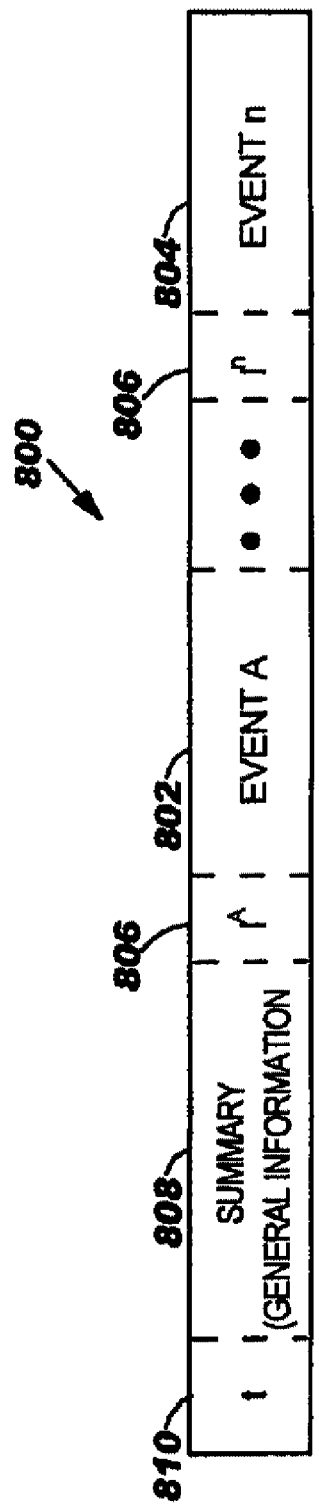
FIG. 8 is an example of another multi-personality event in accordance with another embodiment of the present invention.

FIG. 8 is an example of another multi-personality event 800 in accordance with another embodiment of the present invention. The multi-personality event 800 may be substantially the same as the multi-personality event 620 or 624 formed by the system 600 of FIG. 6. The multi-personality event 800 may also be formed by the method 400 of FIG. 4. The multi-personality event 800 may include substantially complete details for each event 802-804. An individual event length field 806 may be associated with each event 802-804. The multi-personality event 800 may also include a summary 808 of the events 802-804, general information about the incident that caused the events 802 and 804 to be generated, and any additional data or information that may facilitate interpretation and analysis of the events 802-804. An overall event length field 810 may also be included in the multi-personality event 800.

As is evident, the multi-personality event and methods and systems for forming the multi-personality event of the present invention are scalable and capable of dealing with increasing volumes of events and knowledge to interpret and analyze those events because the event details are contained within the multi-personality event. Each additional event is appended to or consolidated with the multi-personality event as the process traverses across the application or event producer components. In this respect the multi-personality event morphs itself into the current component without losing the collected relevant attributes from prior components that represent the overall solution or application. As new components are introduced in the solution or application and management functions and features are deployed, the multi-personality event creation mechanism can automatically discover and collect attributes or events from the new components and represent the new components for end-to-end correlation and analysis.

FIG. 9 is an exemplary system 900 incorporating a method and system to form and analyze multi-personality events in accordance with an embodiment of the present invention. The methods 300 and 400 of FIGS. 3 and 4, respectively, may be embodied in and performed by the system 900. The systems 500 and 600 of FIGS. 5 and 6, respectively, may also be embodied in the system 900. The system 900 may include a computer system 902, server or similar system or device. The computer system 902 may also be a communications device, such as a cellular telephone, mobile computing system, personal digital assistant or similar device.

The computer system 902 may include a system memory or local file system 904. The system memory 904 may include a read only memory (ROM) 906 and a random access memory (RAM) 908. The ROM 906 may include a basic input/output system (BIOS) 910. The BIOS 910 may contain basic routines that help to transfer information between elements or components of the computer system 902. The RAM 908 may contain an operating system 912 to control overall operation of the computer system 902. The RAM 908 may also include a browser 914 or web browser. The RAM 908 may further include data structures 916 or computer-executable code to form multi-personality events similar to that described with respect to methods 300 and 400 of FIGS. 3 and 4, respectively. RAM 908 may also include event producers 918 and at least one event producer adapter 920 or smart event adapters. The event producer adapter 920 may be similar to event producer adapter 520 of FIG. 5 or event producer adapter 618 of FIG. 6. The smart event adapters, if provided, may be similar to smart event adapters 522 and 524 of FIG. 5.

The computer system 902 may also include a processor or processing unit 922 to control operations of the other components of the computer system 902. The operating system 912, browser 914, data structures 916, event producers 918, and adapters 920 may be operable on the processing unit 922.

The processing unit 922 may be coupled to the memory system 904 and other components of the computer system 902 by a system bus 924.

The computer system 902 may also include a hard drive 926.

The hard drive 926 may be coupled to the system bus 924 by a hard drive interface 928. The hard drive 926 may also form part of the local file system 904 or system memory. Programs, software and data may be transferred and exchanged between the system memory 904 and the hard drive 926 for operation of the computer system 902.

The computer system 902 may also include multiple input devices, output devices or combination input/output devices 930 and 932. Each input/output device 930 and 932 may be coupled to the system bus 924 by an input/output interface 934. The input and output devices or combination I/O devices 930 and 932 permit a user to operate and interface with the computer system 902 and to control operation of the browser 914 and data structures 916. The I/O devices 930 may include a keyboard and computer pointing device or the like to perform the control operation of the computer system 902.

The I/O devices 932 may include disk drives, optical, mechanical, magnetic, or infrared input/output devices, modems or the like. The I/O devices 932 may be used to access a medium 936. The medium 936 may contain, store, communicate or transport computer-readable or computer-executable instructions or other information for use by or in connection with a system, such as the computer system 902.

The computer system 902 may also include or be connected to a display or monitor 938. The monitor 938 may be coupled to the system bus 924 by a video adapter 940. The monitor 938 may be used to permit the user to interface with the computer system 902. The monitor 938 may present analysis of the multi-personality events to the user and solutions to the situations or conditions that cause events to be created by components of an event producer, such as event producer 918.

The computer system 902 may communicate with an event consumer 942 or remote system and may access other systems or servers 944 via a network 946. The system bus 924 may be coupled to the network 946 by a network interface 948. The network interface 948 may be a modem, Ethernet card, router, gateway or the like for coupling to the network 946. The coupling may be a wired connection or wireless. The network 946 may be the Internet, private network, or the like.

The event consumer 942 may include a processor 950 to control operation of the event consumer 942. The event consumer 942 may also include a system memory 952. The system memory 952 may include a read only memory (ROM) 954 and random access memory (RAM) 956. ROM 954 and RAM 956 may be similar to ROM 906 and RAM 908 of computer system 902. The RAM 956 may include an operating system 958 to control operation of other components of the server 942. The RAM 956 may also include data structures 960 to interpret, analyze and evaluate multi-personality events, including at least one event consumer adapter 966. The event consumer adapter 966 may be similar to event consumer adapter 622 of FIG. 6. The RAM 956 may further include detailed knowledge 962 or data and general knowledge 964 or data to facilitate analysis and interpretation of the multi-personal events. The detailed knowledge 962 and general knowledge 964 may reside on one or more databases associated with the event consumer 942.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A system to correlate and consolidate a plurality of events, comprising:
   a memory;
   at least one adapter, stored in the memory, to correlate and consolidate every one of the plurality of events to form a multi-personality event, wherein each one of the plurality of events is emitted in response to an incident affecting an event producer, each one of the plurality of events being emitted from a respective one of a plurality of components which form the event producer, the multi-personality event being formed in the at least one adapter that is distinct from the event producer; and
   a plurality of smart event adapters, stored in the memory, to correlate and consolidate every one of the plurality of events to form the multi-personality event, wherein the multi-personality event includes details contained in each event of the plurality of events serially appended to an initial multi-personality event, wherein the plurality of smart event adapters comprises:
      a first smart event adapter to consolidate two events of the plurality of events to form the initial multi-personality event; and
      at least one other smart event adapter being associated with each remaining, unconsolidated event of the plurality of events to consolidate the associated event with the previously formed initial multi-personality event containing previously consolidated events, and wherein the multi-personality event further comprises a reference appended to each event in the multi-personality event for accessing each of the events when doing a detailed diagnosis of the incident.

2. The system of claim 1, further comprising an event producer adapter to correlate and consolidate each of the plurality of events to form the multi-personality event.

3. The system of claim 2, further comprising, another adapter coupled to the event producer adapter to transform the multi-personality event for analysis by an event consumer.

4. The system of claim 1, wherein the multi-personality event comprises an event detail for each consolidated event.

5. The system of claim 1, wherein the multi-personality event comprises:
   a summary of all consolidated events; and
   an event detail for each consolidated event.

6. A computer program product to correlate and consolidate a plurality of events, the computer program product comprising:
   a computer readable storage medium having computer readable program code embodied therein, the computer readable storage medium comprising:
   computer readable program code configured to consolidate every one of the plurality of events to form a multi-personality event, wherein each one of the plurality of events is emitted in response to an incident affecting an event producer, wherein each event is emitted from a respective one of a plurality of components which form the event producer;
   computer readable program code configured to form the multi-personality event in an event producer adapter that is distinct from the event producer, wherein the multi-personality event is formed by serially appending details contained in each event to a first multi-personality event formed by two of the events in a smart event adapter, each remaining event being serially appended to the first multi-personality event using a separate smart event adapter for each remaining event, and wherein the computer readable program code is further configured to form the multi-personality event by appending a reference to each event in forming the multi-personality event for accessing each of the events when doing a detailed diagnosis of the incident; and
   computer readable program code configured to provide the multi-personality event to an event consumer.

7. The computer program product of claim 6, further comprising:
   computer readable program code configured to consolidate two events of the plurality of events to from form an initial multi-personality event; and
   computer readable program code configured to continue consolidating any remaining, unconsolidated events of the plurality of events one at a time with the initial multi-personality event to form the multi-personality event including all of the plurality of events.

8. The computer program product of claim 6, further comprising computer readable program code configured to form a summary of all consolidated events and to include the summary with event details for each event to form the multi-personality event.

9. The computer program product of claim 6, further comprising computer readable program code configured to append details contained in each event to form the multi-personality event.

10. The computer program product of claim 6, further comprising computer readable program code configured to determine an event length for each event and to provide the event length in an associated event length field for each event in the multi-personality event.

11. The computer program product of claim 6, further comprising computer readable program code configured to serially add each event of the plurality of events to form the multi-personality event.

12. A system to correlate and consolidate a plurality of events, comprising:

a memory;

at least one adapter, stored in the memory, to correlate and consolidate every one of the plurality of events to form a multi-personality event, wherein each one of the plurality of events is emitted in response to an incident affecting an event producer, each one of the plurality of events being emitted from a respective one of a plurality of components which form the event producer, the multi-personality event being formed in the at least one adapter that is distinct from the event producer;

a plurality of smart event adapters, stored in the memory to correlate and consolidate every one of the plurality of events to form the multi-personality event, wherein the multi-personality event includes details contained in each event of the plurality of events serially appended to an initial multi-personality event formed by two of the plurality of events, each remaining event being serially appended to the initial multi-personality event, and wherein the multi-personality event further comprises a reference appended to each event in the multi-personality event for accessing each of the events when doing a detailed diagnosis of the incident, the plurality of smart event adapters comprising:

a first smart event adapter to consolidate the two events of the plurality of events to form the initial multi-personality event; and at least one other smart event adapter, one smart event adapter being associated with each remaining, unconsolidated event of the plurality of events to consolidate the associated event with the previously formed initial multi-personality event containing previously consolidated events.

13. The system of claim 12, further comprising an event producer adapter for forming a summary from all events; and wherein the event producer adapter is adapted to include the summary with event details for each event to form the multi-personality event.

14. The system of claim 12, further comprising an event consumer adapter to transform the multi-personality event for analysis by an event consumer.

15. The system of claim 12, wherein the multi-personality event comprises an event detail for each consolidated event.

16. The system of claim 12, wherein the multi-personality event comprises:

a summary of all consolidated events; and an event detail for each consolidated event.

* * * * *